Aug. 22, 1939.   B. G. JUTTING   2,170,414
ROTARY DIESEL ENGINE
Filed Sept. 17, 1937    3 Sheets-Sheet 1

INVENTOR.
Bernhard G. Jutting
BY
Henrik J. Schmidt
ATTORNEY

Aug. 22, 1939.   B. G. JUTTING   2,170,414
ROTARY DIESEL ENGINE
Filed Sept. 17, 1937   3 Sheets-Sheet 3
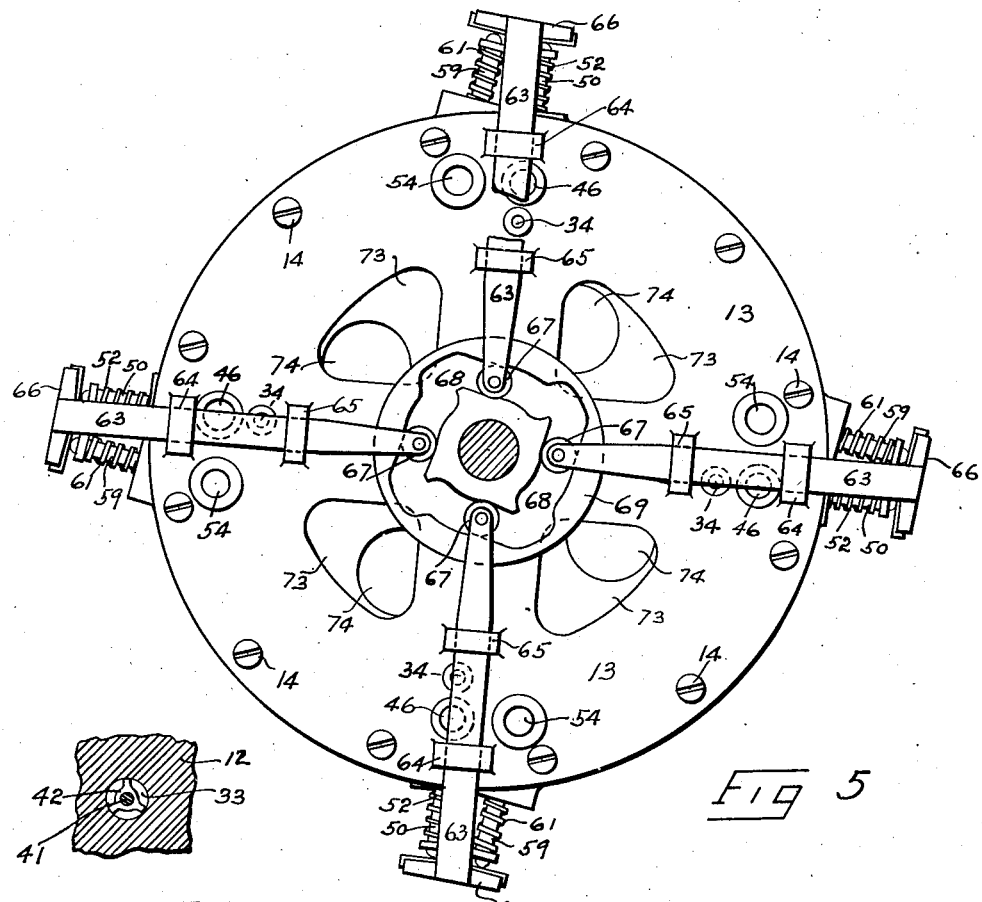
Fig 5
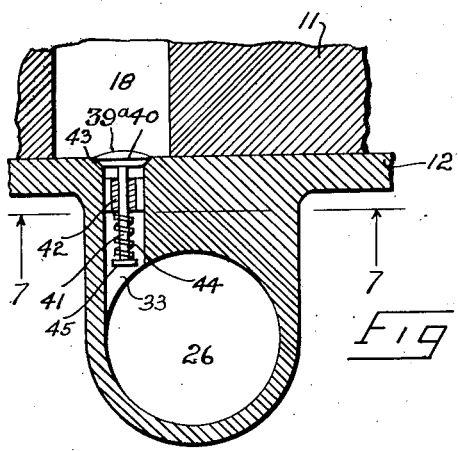
Fig 7
Fig 6
Fig 8
INVENTOR.
Bernhard G. Jutting
BY
ATTORNEY.

Patented Aug. 22, 1939

2,170,414

UNITED STATES PATENT OFFICE 2,170,414

ROTARY DIESEL ENGINE

Bernhard G. Jutting, New Brunswick, N. J.

Application September 17, 1937, Serial No. 164,293

4 Claims. (Cl. 123—16)

The invention relates to Diesel engines of the rotary type and has for one of its main objects to provide an engine which will develop a high rate of horsepower in proportion to its weight and size. Another object is to provide an engine in which all the parts are perfectly balanced in all positions. A further object is to provide effective means for cooling the engine. Additional objects are to provide an engine which has no parts easily broken or apt to get out of order or worn, and which can be manufactured at a relatively low cost.

These and various other objects and advantages will be readily understood from the following description and from the accompanying drawings of a preferred embodiment of the invention, in which, however, modifications may be made without departing from the scope of the appended claims. In the drawings, Fig. 1 is a front view of the engine;

Fig. 5 is a rear view of the engine;

Fig. 6 is a fragmental, cross-sectional top view, taken on line 6—6 in Fig. 1;

Fig. 7 is a cross-sectional view, taken on line 7—7 in Fig. 6; and

Fig. 8 is a cross-sectional top view of a certain valve used in the engine.

Figure 3:
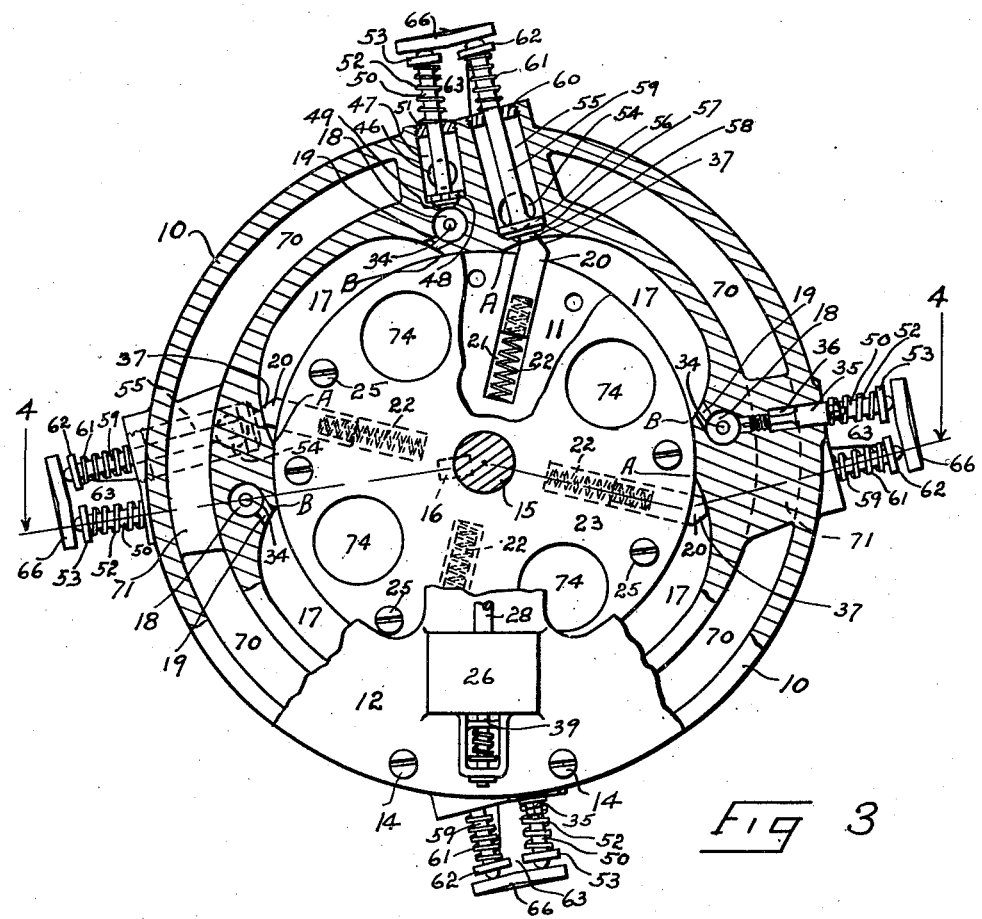
Fig. 3 is a cross-sectional front view, taken approximately on line 3—3 in Fig. 3.
Figure 4:
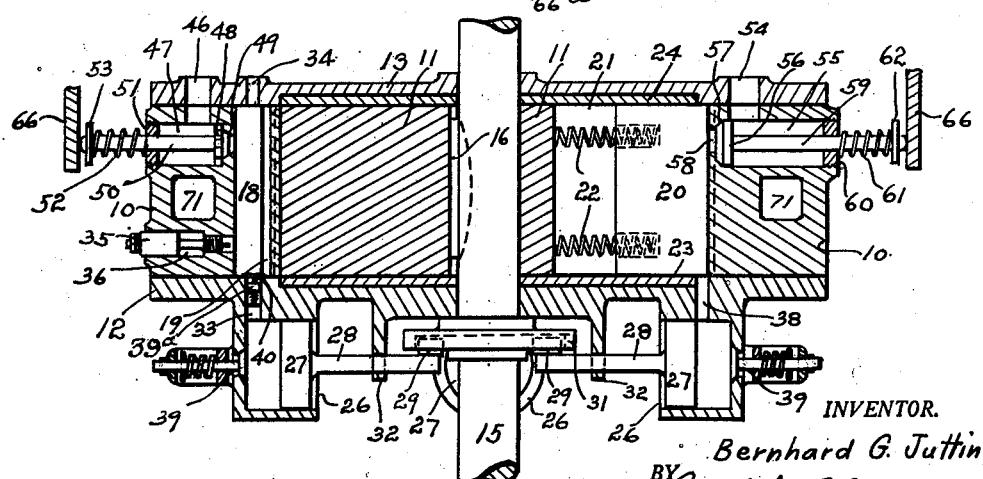
Fig. 4 is a cross-sectional top view, taken approximately on line 4—4 in Fig. 3.

Referring first to Figs. 3 and 4, the engine consists of a cylindrical stator or casing 10 in which a rotor 11 is mounted between two side plates 12 and 13 which are secured to the casing by means of screws 14. The rotor is rigidly secured on a shaft 15 by means of a key 16. A plurality of expansion chambers 17 are formed on the inner side of the casing. In this particular embodiment four such expansion chambers are employed, but, of course, the engine may be built with a different number of such chambers. The expansion chambers are shaped as plainly shown in Fig. 3 and extend clear across the casing. The outer wall of each expansion chamber is defined by a plane moved parallel to the axis of the rotor in a slow curve from a point on the circumference of the rotor at one end and in a slow curve to a point on the circumference of the rotor at the other end of the expansion chamber.

At one end of each of the expansion chambers a fuel compression chamber 18 is located. In these chambers the fuel and air is compressed. An elongated passage 19 leads from each fuel chamber to the adjacent expansion chamber 17. Four vanes 20 are slidingly mounted in slots 21 milled radially in the rotor. These vanes extend clear across the expansion chambers and are urged outwardly by compression springs 22 which are mounted in the bottom of the slots. The vanes are held between side plates 23 and 24, secured to the rotor by means of screws 25.

Figure 1:
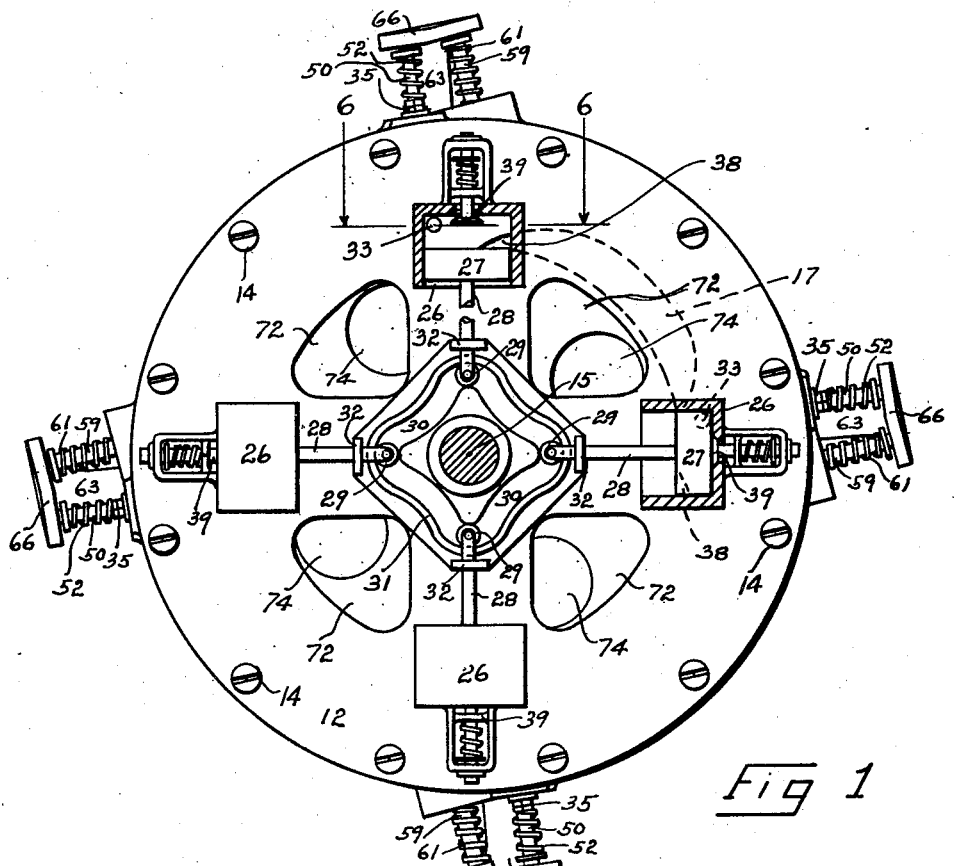
Figure 2:
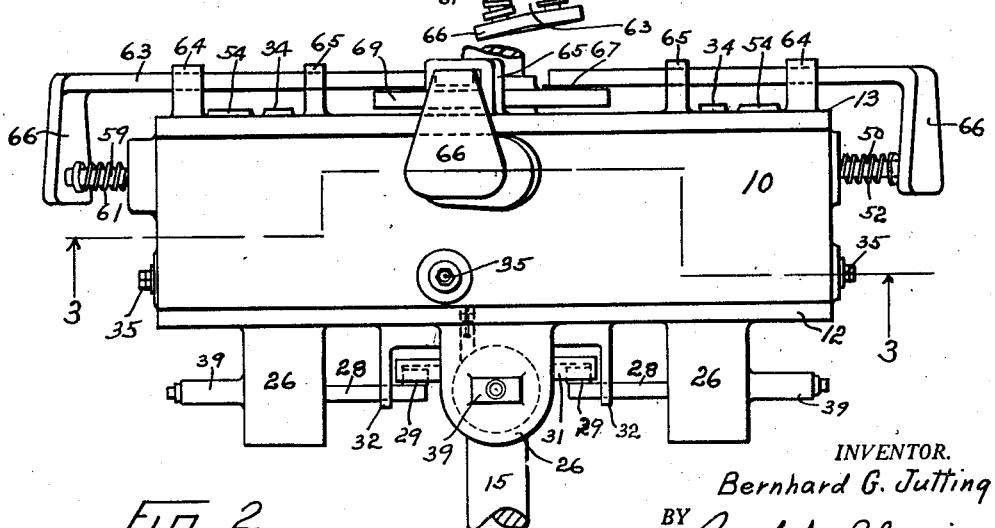
Fig. 2 is a top view.

Referring now also to Figs. 1 and 2, four cylinders 26 are mounted on the front plate 12 and in each of these cylinders a piston 27 operates. In Figure 1 the piston 27 at the top is shown displaced to the position it would occupy when the cam 30 is in another position. The piston rods 28 of these pistons are provided, at their free end, with rollers 29 which engage in a groove 30, of a cam 31 rigidly mounted on the shaft 15. The piston rods are guided in brackets 32 formed on the front plate. It will be seen that as the shaft rotates, the movement of the rollers in the groove in the cam 31, will cause the pistons to reciprocate in the cylinders. These cylinders are for the purpose of forcing the air compressed by the rotor vanes 20 to the fuel compression or precombustion chambers 18 through passages 33 which lead from the cylinders to the fuel compression chambers. One of these passages is plainly shown in Figs. 6 and 7. The valves located in these passages will be described later.

A fuel inlet 34 is provided at the end of each fuel chamber and these inlets are connected with an oil pump, which is not shown as this may be of any standard type. Each of the fuel chambers is also provided with an ignition device 35, which is used for starting the engine and which is of the standard type and connected with a suitable source of electricity. These ignition devices are inserted in openings 36 which extend to the outside of the casing. When the explosion takes place in the fuel chamber, the vanes 20 are so located that the ends 37 of the vanes cover the passages 19. The explosions occurring at the rear of the vanes, cause the rotor to turn and, as the vanes extend completely across the expansion chambers, the ignited fuel expands behind the vanes. The air in front of the vanes, which was contained in the expansion chambers, is forced through openings 38 and into the cylinders 26, on top of the pistons. One of these openings 38 is plainly shown in Fig. 1 where one of the expansion chambers is shown in dotted lines. It is also shown in the right hand piston in Fig. 4. The air thus forced into the cylinders, by the action of the vanes 20, is next compressed into the fuel chambers 18, by the actions of the pistons, as the cam 31 rotates.

The timing of the action of the pistons is such that the compression takes place immediately after the vanes have covered the openings 19. As the compression now explodes the fuel, another impulse is given to the vanes, thus continuously turning the rotor and imparting the motion and power to the shaft 15.

To prevent a vacuum from being formed in the cylinders, when the pistons are drawn out, spring-operated valves 39 are used. As these valves are of the ordinary type, it is not believed that they need any further description. To prevent expanding gases from entering the cylinders, the valves 39a shown in Figs. 6 and 7 are employed. These valves 39a are inserted in the passages 33, which lead from the cylinders 26 to the fuel chambers 18, and each consists of an ordinary tappet valve 40, the stem 41 of which is mounted in a spider 42 located in the passage 33. The valve is seated against the valve seat 43 by means of a compression spring 44 which abuts against the spider and a washer 45 secured on the end of the valve stem. From this it will be seen that while air will flow from the cylinder and into the fuel chamber 18, the expanding gases cannot flow from the chamber 18 and into the cylinder 26.

Referring now also to Fig. 5, the expanded gases are removed from the fuel and expansion chambers in the following manner: Scavenging-air inlets 46 each lead to a valve chamber 47 in which a valve 48 operates against a valve seat 49 which is connected by an opening with the fuel chamber 18. The valve is of the spider type as shown in Fig. 8 and provided with a valve stem 50 which is guided in a threaded bushing 51. The valve is held against the valve seat by a compression spring 52 which abuts against the bushing 51 and a washer 53, riveted on the end of the valve stem. Scavenging-air and burnt-fuel-mixture exhaust ports 54 are each connected with a valve chamber 55 in which a valve 56 operates. This valve is seated against a valve seat 57 which is connected to the expansion chamber by an opening 58. The valve is provided with a valve stem 59 which is guided in a threaded bushing 60. A compression spring 61 which abuts against the bushing 60 and a washer 62, riveted on the end of the valve stem tends to lift the valve off its seat.

All of these valves are located towards the rear side of the casing, as plainly shown in Figs. 2 and 4. They are operated by sliding bars 63, each of which is mounted in pairs of brackets 64 and 65 formed on the side plate 13. Each of the bars is provided with a head 66 and each of these heads engages two valves, one scavenging-air inlet valve and one scavenging-air outlet valve. The bars are provided with rollers 67, at the free ends, and these rollers engage in a groove 68 formed in a cam 69 which is rigidly secured on the shaft 15.

It will be seen that as the cam rotates the valves are alternately opened and closed. The timing of the opening of the valves is so arranged that it takes place while the vanes move from the points A to the point B, indicated in Fig. 3. When the valves are open, a current of air is forced through the inlet 46, valve chamber 47, fuel chamber 18, expansion chamber 17, opening 58 and through the valve chamber 55 out through the exhaust opening 54 thereby carrying along the burnt-fuel-mixture. Thus, all the exhaust gases are removed from the fuel and expansion chambers.

To cool the engine, water spaces 70 are formed in the casing and extend clear across the casing from side plate to side plate. Each of these spaces is connected by a narrow duct 71 so that the water may be circulated through all the spaces by a suitable circulating pump, not shown. Triangle openings 72 and 73 are formed, respectively, in the front and rear cover, while circular openings 74 are formed in the rotor 11 and the side plates mounted on this rotor. Air may be forced through these openings to cool the periphery of the rotor.

Having described the invention and its objects, what I claim as new and wish to protect by Letters Patent is:

1. An engine of the type described comprising a cylindrical casing; a plurality of equally spaced fuel compression-chambers formed in said casing; ignition means in said compression chambers; a pair of side plates secured to said casing and provided with concentric bearings; a shaft rotatingly mounted in said bearings; a plurality of expansion chambers formed in the interior of the casing and adjacent to the compression chambers; ports leading from the compression chambers to the expansion chambers; exhaust ports leading from the ends of the expansion chambers furthest removed from the compression chambers; valves in the exhaust ports; a rotor keyed to the shaft; a plurality of spring-actuated vanes slidingly mounted, radially, in the rotor; said vanes made of a width equal to the width of the expansion chambers and adapted to move through said chambers and to move the rotor, as the fuel in the compression chambers is ignited and expanded behind them; a scavenging air inlet connected with each fuel compression chamber; a valve for closing this inlet; exhaust outlets associated with the exhaust ports; another valve for closing these outlets; and means for opening and closing said valves in timed relation to the rotation of the rotor.

2. An engine of the type described comprising a cylindrical casing; a plurality of equally spaced fuel compression-chambers formed in said casing; ignition means in said compression chambers; a pair of side plates secured to said casing and provided with concentric bearings; a shaft rotatingly mounted in said bearings; fuel inlets into said compression chambers; a plurality of expansion chambers formed in the interior of the casing and adjacent to the compression chambers; ports leading from the compression chambers to the expansion chambers; exhaust ports leading from the ends of the expansion chambers furthest removed from the compression chambers; valves in the exhaust ports; a rotor keyed to the shaft; a plurality of spring-actuated vanes slidingly mounted, radially, in the rotor; said vanes made of a width equal to the width of the expansion chambers and adapted to move through said chambers and to move the rotor, as the fuel in the compression chambers is ignited and expanded behind them; a scavenging-air inlet connected with each fuel compression chamber; a valve for closing this inlet; exhaust outlets associated with the exhaust ports; another valve for closing these outlets; means for opening and closing said valves in timed relation to the rotation of the rotor; an air compression cylinder associated with each set of the fuel compression and expansion chambers; an opening leading from the expansion chamber to said cylinder; another opening leading from said cylinder to the fuel compression chamber; a piston associated with each of said cylinders; and means for reciprocating said pistons, in timed relation to the rotor, to compress the air exhausted from the expansion chamber into the fuel compression chamber.

3. An engine of the type described comprising a cylindrical casing; a plurality of equally spaced fuel compression-chambers formed in said casing; ignition means in said compression chambers; a pair of side plates secured to said casing and provided with concentric bearings; a shaft rotatingly mounted in said bearings; air and fuel inlets into said compression chambers; a plurality of expansion chambers formed in the interior of the casing and adjacent to the compression chambers; ports leading from the compression chambers to the expansion chambers; exhaust ports leading from the ends of the expansion chambers furthest removed from the compression chambers; valves in the exhaust ports; a rotor on the shaft; a plurality of spring-actuated vanes slidingly mounted, radially, in the rotor; said vanes made of a width equal to the width of the expansion chambers and adapted to move through said chambers and to move the rotor, as the fuel in the compression chambers is ignited and expanded behind them; a scavenging-air inlet connected with each fuel compression chamber; a valve for closing this inlet; exhaust outlets associated with the exhaust ports; another valve for closing these outlets; means for opening and closing said valves in timed relation to the rotation of the rotor; and a water jacket formed in the casing through which water may be circulated to cool it.

4. An engine of the type described comprising a cylindrical casing; a plurality of equally spaced fuel compression-chambers formed in said casing; ignition means in said compression chambers; a pair of side plates secured to said casing and provided with concentric bearings; a shaft rotatingly mounted in said bearings; a plurality of expansion chambers formed in the interior of the casing and adjacent to the compression chambers; ports leading from the compression chambers to the expansion chambers; exhaust ports leading from the ends of the expansion chambers furthest removed from the compression chambers; valves in the exhaust ports; a rotor on the shaft; a plurality of spring-actuated vanes slidingly mounted, radially, in the rotor; said vanes made of a width equal to the width of the expansion chambers and adapted to move through said chambers and to move the rotor, as the fuel in the compression chambers is ignited and expanded behind them; a scavenging-air inlet connected with each fuel compression chamber; a valve for closing this inlet; exhaust outlets associated with the exhaust ports; another valve for closing these outlets; means for opening and closing said valves in timed relation to the rotation of the rotor; a water jacket formed in the casing through which water may be circulated to cool it; and a plurality of openings formed through the side plates and through the rotor through which air may be forced to cool the rotor.

BERNHARD G. JUTTING.